United States Patent [19]

Yu et al.

[11] 4,372,865

[45] Feb. 8, 1983

[54] CARBONATE/HYDROXIDE COPRECIPITATION PROCESS

[75] Inventors: Bu-Fan B. Yu, Butler; Alex Goldman, Pittsburgh, both of Pa.

[73] Assignee: Spang Industries, Inc., Butler, Pa.

[21] Appl. No.: 191,012

[22] Filed: Sep. 26, 1980

[51] Int. Cl.³ ............................................ C04B 35/38
[52] U.S. Cl. ............................... 252/62.62; 252/62.56; 423/419 P; 423/594; 264/65
[58] Field of Search ........................ 252/62.56, 62.62; 423/594, 419 P; 264/65

[56] References Cited

U.S. PATENT DOCUMENTS

| | | |
|---|---|---|
| 2,903,429 | 9/1959 | Guillaud . |
| 3,027,327 | 3/1962 | Blank ................................ 252/62.62 |
| 3,542,685 | 11/1970 | Iwase et al. ................. 252/62.56 X |
| 3,652,416 | 3/1972 | Sugano et al. .............. 252/62.62 X |
| 3,725,298 | 4/1973 | Woodhead et al. ......... 252/62.62 X |
| 3,743,707 | 7/1973 | Iwase et al. ................. 252/62.56 X |
| 3,822,210 | 7/1974 | Iwase et al. ................. 252/62.62 X |
| 4,097,392 | 6/1978 | Goldman et al. ............... 252/62.62 |
| 4,226,843 | 10/1980 | Watanabe et al. ............. 252/62.62 |

FOREIGN PATENT DOCUMENTS

| | | |
|---|---|---|
| 2110757 | 6/1972 | France . |
| 219582 | 3/1974 | France . |
| 48-70719 | 9/1973 | Japan . |
| 1142214 | 2/1969 | United Kingdom . |
| 1142215 | 2/1969 | United Kingdom . |
| 1380721 | 1/1975 | United Kingdom ............... 423/594 |

Primary Examiner—Jack Cooper
Attorney, Agent, or Firm—Shanley, O'Neil & Baker

[57] ABSTRACT

The present invention improves the processing and products of coprecipitation of Fe and other metals selected from Mn, Zn, Ni, and Mg as carbonates and hydroxides in the manufacture of magnetically soft ferrites. Teachings are provided which enable control of the characteristics, especially the particle shape of coprecipitated metal carbonates and hydroxides, to bring about significant advantages in further processing such as relief of critical sintering requirements to meet commercial specifications, improved intermediate products which can be more easily handled during processing, and improved quality magnetically-soft, compacted, ferrite components.

In the manufacture of MnZn ferrites, sintering furnace temperatures encountered by components from the same batch can vary as much as 100° C. while maintaining specifications of permeability and loss factor whereas, with prior ferrite materials, a variation of as little as 5° C. to 10° C. can make the difference between acceptable and non-acceptable product.

9 Claims, 11 Drawing Figures

CARBONATE/HYDROXIDE COPRECIPITATION PROCESS

This invention is concerned with magnetically soft ferrite manufacturing processes and product; more specifically, with significant discoveries in the carbonate/hydroxide coprecipitation manufacturing process for magnetically soft ferrites which provide improved intermediate and final product.

Advantages of the carbonate/hydroxide coprecipitation process for manufacturing materials for magnetically soft ferrites over conventional "dry" and hydroxide coprecipitation processes are set forth in assignee's U.S. Pat. No. 4,097,392, entitled "Coprecipitation Methods and Manufacture of Soft Ferrite Materials and Cores", issued June 27, 1978 which provides a detailed background for the present invention and is incorporated herein by reference. In brief, coprecipitation of materials for manufacture of magnetically soft ferrites offers advantages, such as enhanced homogenity, which are difficult to obtain with conventional dry processing in which dry pulverant materials are mixed, treated, and formed into cores as disclosed in the to Guillaud U.S. Pat. Nos. 2,886,529 and 2,903,429, and Goldman U.S. Pat. No. 3,860,524. Also, coprecipitation of divalent metals as hydroxides, as disclosed in the patent to Sugano et al U.S. Pat. No. 3,652,416, presents certain difficulties; e.g. in separating precipitate and in manufacturing of components, which are eliminated by coprecipitation of both carbonates and hydroxides.

The present invention improves the processing and products of carbonate/hydroxide coprecipitation of divalent metals for manufacture of magnetically soft ferrites. Teachings are provided which enable control of the characteristics, including the particle size and shape of coprecipitated metal carbonates and hydroxides, to bring about significant advantages in further processing, in materials used in the manufacture of magnetically soft ferrites, and in magnetically soft compacted ferrite components.

In the accompanying drawings:

FIG. 1 is a flowsheet for schematically illustrating the invention;

FIG. 2 schematically illustrates stirred-flow reactor apparatus used in carrying out a specific embodiment of the invention.

In carrying out the wet process of the invention, an aqueous solution of ferrous ions and other divalent metal ions is formed, e.g., by dissolving such metals in acid. This metal ion solution is reacted with a base solution of carbonates and hydroxides to coprecipitate ferrous and other divalent metal carbonates while concurrently coprecipitating ferrous and other divalent metal hydroxides. This simultaneous coprecipitation of metal hydroxides and metal carbonates is accomplished essentially without conversion of ferrous ions to ferric ions. The present invention teaches wet process steps for controlling the coprecipitation and the precipitate formed to provide special properties especially suitable for further processing and eventual manufacture of high quality magnetically soft ferrite components by pressure compaction.

In this wet process manufacture of intermediate products for eventual conversion to ferrimagnetic material and manufacture of compacted magnetically soft MnZn, NiZn, MgMn and Ni ferrite components, ferrous ions and other divalent metal ions selected from the group consisting of $Mn^{++}$, $Zn^{++}$, $Ni^{++}$, and $Mg^{++}$ are used.

Important aspects of the invention involve physical mixing of the metal ion and base solutions for reaction and, handling of the precipitate in its mother liquor before separation. Characteristics of the coprecipitated particles, including size and shape, are controlled by processing parameters such as the carbonate/hydroxide ratio of the base solution, concentration of the metal ion and base solutions, digestion time in the mother liquor and, the type and degree of mixing of the metal ion and base solutions for coprecipitation and in the handling of the precipitate in the mother liquor within a prescribed period after precipitation.

The latter process steps of mixing and handling before separation of the precipitated particles are of major significance in obtaining selected properties. In a specific embodiment, the reactants are combined for complete and homogenous precipitation while minimizing physical mixing time; the precipitates are then held in the mother liquor for an extended period, free of agitation, to establish desired particle size and shape. It has been discovered that production of spherical particles reduces shrinkage problems during subsequent calcining and provides a latent insensitivity to process conditions during other steps, especially where additives are involved, which facilitates manufacture of compacted components within desired specifications of permeability and loss factor.

Figure 1:
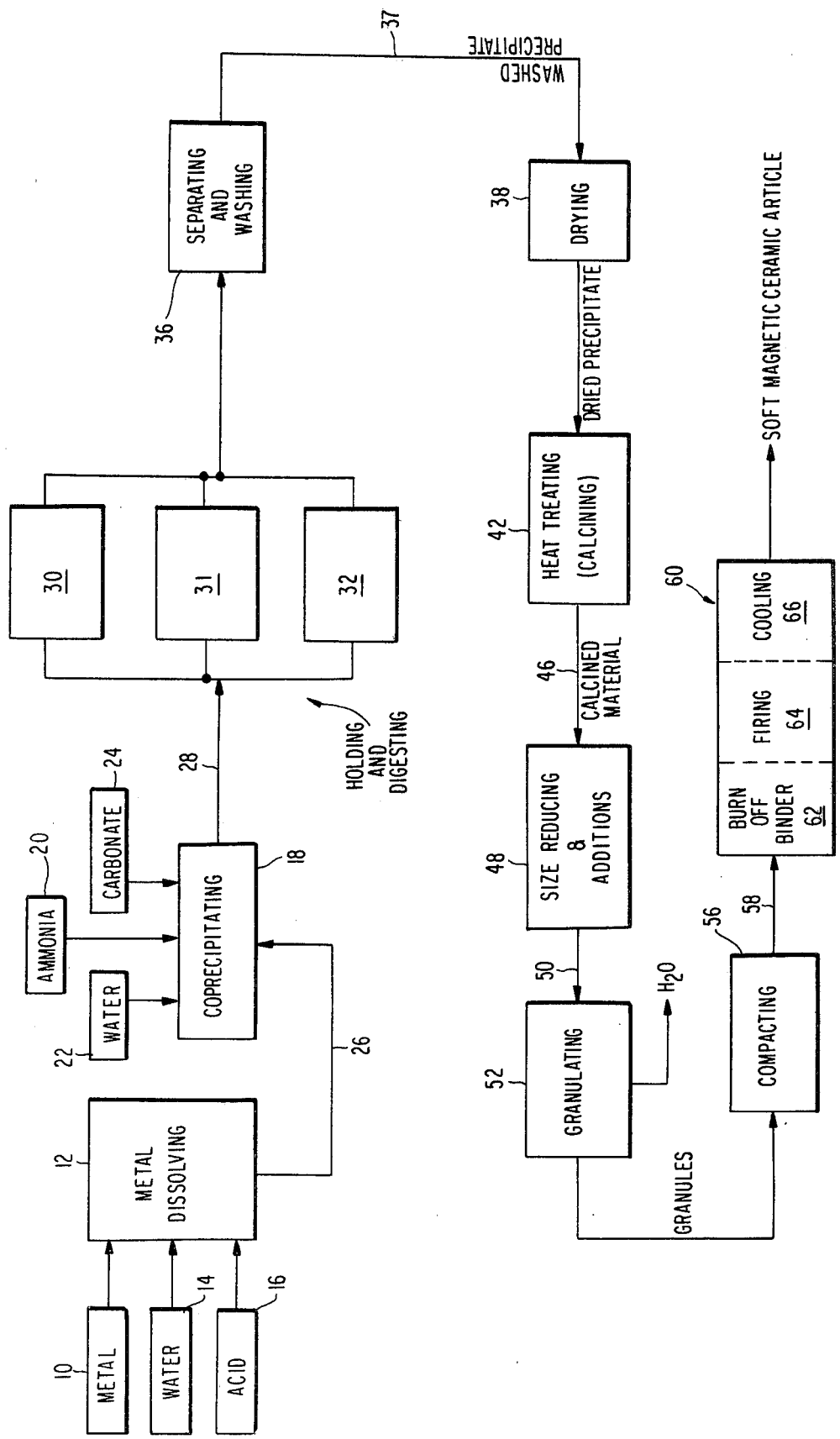

Steps for carrying out teachings of the invention in the manufacture of soft ferrite components are shown schematically in FIG. 1. Metals are provided from source 10. An aqueous solution of metal ions is formed by initially adding preselected proportions of the metals from source 10 to an acid solution in dissolving zone 12. The metals are preferably in easily dissolvable form, such as flakes, powder, thin strips, or small pellets and can be selected to have a total purity level greater than 99.9% by weight for purposes of producing the highest quality ferrite components.

The amount of metals dissolved is determined by the relative proportions of oxides desired in the finished product. The initial proportions are calculated stoichiometrically with allowance for minor iron pickup in a later size-reducing step.

In the production of manganese-zinc ferrite components, the proportions are selected within the following ranges:

66% to 72% iron,
10% to 23% manganese, and
5% to 18% zinc, these being the weight percentages of metals utilized based on the total weight of the three metals, to produce a ferrite having the following mole percentages:

50% ferric oxide ($Fe_2O_3$),
2% to 9% ferrous oxide (FeO),
31% to 36% manganese oxide (MnO), and
10% to 15% zinc oxide (ZnO).

The ratio of ferric ions to divalent metal ions is 2:1 and the total iron present is usually expressed as ferric oxide so that the mole percentage can be expressed as about 52.5 to about 55% ferric oxide ($Fe_2O_3$).

After the metals have been introduced into dissolving zone 12, de-ionized water from source 14 is introduced. Then sulfuric acid from source 16 is added to dissolve the metals producing an aqueous solution of ferrous ions and divalent ions of manganese and zinc. Concentrated sulfuric acid is used in an amount ranging from about 10% to about 30% over stoichiometric requirements to keep the metal sulfates in solution, i.e. prevent hydrolysis. The pH of the metal sulfate solution is within a range of 1 to 3, preferably about 1.2. The reaction is $$H_2SO_4 + M \rightarrow MSO_4 + H_2 \uparrow$$

where "M" represents the metals dissolved. The dissolving of the metals can be facilitated by heating and stirring.

The aqueous solution of metal ions is formed to have a concentration of metal ions ranging from about 1.4 to about 1.6 moles per liter. A minimum amount of water is used prior to addition of the acid and final predetermined concentration is adjusted with water after metal dissolution has been accomplished. Concentrations lower than about 1.4 molar are undesirable because of economy of space. Higher concentrations than about 1.6 molar are undesirable because sulfates tend to crystallize out.

By controlled preparation of a base solution containing both carbonate ions and hydroxide ions, provision is made for the coprecipitating reaction between the ferrous, manganese, and zinc ions to take place simultaneously with both carbonate ions and hydroxide ions so that ferrous, manganese and zinc carbonates and ferrous, manganese, and zinc hydroxides are precipitated concurrently. The representative reactions are:

$$M^{++} + CO_3^{--} \rightarrow MCO_3$$

$$M^{++} + 2OH^- \rightarrow M(OH)_2$$

where "M" represents the divalent metal ions, $Fe^{++}$, $Mn^{++}$ and $Zn^{++}$.

The carbonates or bicarbonates and hydroxides can be mixed in various ratios to effect the desired carbonate/hydroxide ratio in the process.

The coprecipitation reactions are preferably carried out in accordance with the invention by intermixing the metal ion solution and the solution of carbonate ions and hydroxide ions, e.g. in a stirred-flow reactor. In the manufacture of manganese-zinc material, the carbonate and hydroxide ion solution is preferably formed from ammonium bicarbonate and ammonium hydroxide.

Utilizing tank 18 of FIG. 1, ammonia from source 20 can be introduced with water from source 22 to form ammonium hydroxide to a calculated predetermined concentration.

$$NH_3 + H_2O \rightarrow NH_4^+ + OH^-$$

The amount of carbonate (derived from bicarbonate) in accordance with the following reaction:

$$NH_3 + HCO_3^- \rightarrow NH_4^+ + CO_3^{--}$$

needed to stoichiometrically react with the metal ions (1:1) plus a 20% excess is calculated and added directly from source 24 of FIG. 1, to the prepared ammonium hydroxide solution. A pH of about twelve (12) is produced with the ammonia before addition of the bicarbonate. Addition of the predetermined amount of bicarbonate to the hydroxide solution lowers the pH to approximately 11, usually in the range of 10.8 to 11. The molar ratio of $NH_4HCO_3$ to $NH_4OH$ is maintained in the range of 3:1 to 1:3, with a preferred ratio of 1:1.

The order of additions of bicarbonates and hydroxides can be reversed and the process remain workable. In any event, the final bicarbonate concentration and the hydroxide concentration should be in the range of from 1 to 3 molar (total) with 1.5 being preferred.

The temperature of the ammonium bicarbonate should be kept low enough to avoid decomposition ($NH_4HCO_3 \rightarrow NH_3 + H_2O + CO_2$).

The carbonate/hydroxide base solution and metal ion acid solution are reacted in a batch process or in a continuous process in a stirred-flow reactor. The latter is especially suited to the process because the residence time is readily controllable as explained in relation to FIG. 2. Mixing time is preferably between about five (5) and thirty (30) seconds in a stirred-flow reactor.

In a batch process the ferrous, manganese, and zinc ion solution is preferably added to the base solution. Such addition is continued until the pH is at a selected value, ranging roughly from about seven point five (7.5) to about eight point five (8.5), with a preferred pH value of seven point eight (7.8).

In either the batch or stirred-flow processing, the resulting slurry (precipitate in a mother liquor) is transferred, e.g., via conduit 28, to a holding and digestion zone. Multiple vats, such as 30, 31, 32 of FIG. 1, are connected for alternate usage in order to enable the desired holding and digesting time in a continuous or semi-continuous process.

In a specific embodiment of preparing materials for manufacture of MnZn ferrites, digestion time is selected to be in excess of one (1) hour and need not exceed twenty-four (24) hours; holding the precipitate in the mother liquor, free of applied agitation; about sixteen (16) hours at 20° C. is a representative example. Digestion is time/temperature dependent; at higher temperatures, digestion time can be reduced. After the particles are formed, they can be separated, filtered, etc., with rough handling without detriment to the particles.

Separation of the precipitate particles from the mother liquor, after desired digestion time, can be carried out by decanting the supernatant liquid followed by filtering the residue, e.g., in a rotary vacuum filter, or other known separation methods, such as centrifugation, at separating zone 36 which also can include provision for washing the precipitate.

The separated and washed precipitate is transferred by means 37 to a drying zone 38. Drying can be carried out in a batch or continuous process with the washed precipitate being spread in thin layers and exposed in a drying oven to a temperature ranging from about 150° C. to about 200° C. in an air atmosphere.

The dried precipitate is then heat treated. Heat treatment means 42 can be a conventional rotary calciner. This wet process material can be calcined at a temperature substantially less than that employed with conventional dry process mangnanese-zinc material. In the present process, calcining can be carried out at temperatures above about 500° C. Preferably, calcining is carried out at temperatures ranging from 600° C. to 800° C. Residence time in a continuous-type calciner ranges from about 0.5 to about 1 hour. With batch calcining the time is increased, with total time being in part dependent on final heat (sintering) treatment.

With the large spherical coprecipitated particles established in accordance with the invention, shrinkage during the calcining statge is reduced; scanning electron micrographs show little, if any, shrinkage of the individual particles indicating high density of such particles.

Calcined material transferred by means 46 is preferably size reduced, in a wet state, in ball mill 48 using a deflocculent such as ammonium lignosulfate to maintain high solids content. This size reducing is carried out to obtain an average pulverant material size preferably ranging from about 0.3 to about 0.7 microns in terms of the diameter of a spherical particle; individual pulverant material particles generally have a size ranging from 0.1 to approximately 1 micron.

Conventional additives, such as calcium $CaCO_3$ and/or silica $SiO_2$ (in weight percentages as described in the U.S. Pat. to Guillaud, No. 2,886,529 and Akashi et al, No. 3,106,534) are advantageously introduced early in the ball milling stage, as are any special purpose additives such as titanium dioxide or tin oxide, if the latter are to be used. The invention enables control of precipitates so that, in a specific embodiment of the invention, additives will not adversely affect grain growth during subsequent high temperature sintering; the control provided in the specific embodiment prevents discontinuous grain growth as described later.

Binders and plasticizers are preferably admixed by introduction into the water and in the ball mill toward the end of the milling step. A suitable binder is polyvinyl alcohol. A typical plasticizer is polyethylene glycol 400.

The mix resulting from size reduction, and admixing binder and optional additives, is transferred by means 50 for granulation in apparatus 52. Spray drying methods and apparatus are preferred for granulating because they produce a free-flowing powder for pressing; however, other granulating methods can be used. Spray drying produces spherical granules containing many ferrite particles bound together. Such agglomerated granules facilitate pressing. Size of the spray dried granules is selected to be about 45 to 250 microns.

The resulting granules are compacted at means 56 which can be a conventional pressing apparatus. Conventional dies for pressing dry process manganese-zinc ferrites are used with materials of the present invention. The compacting is preferably carried out at pressures ranging from about fifteen (15) to about twenty-five (25) tons per square inch. A suitable green density in the range of about two (2) to about three point five (3.5) grams per cubic centimeter is obtained.

The compacted articles are transferred by means 58 toward a final heat treatment stage. Heat treatment apparatus 60 can include an initial zone 62 in which binder is burned off in an air atmosphere. Temperatures of 300° C. to 600° C. are available however, preferably, the binder is burned off between about 400° C. and 500° C.

Following passage through the binder burn-off zone, the articles pass through a firing (sintering) zone 64 and cooling zone 66.

A significant advantage of the invention relates to a pronounced insensitivity to sintering temperatures encountered by individual components while maintaining magnetic property values, such as toroidal permeability and loss factor, within commercial specifications. Thus, product specifications can be readily met notwithstanding differences in sintering temperatures encountered by components from the same batch during processing. This adaptability to differing sintering temperatures (over a range of at least 100° C. for MnZn ferrites) has distinct processing advantages over accepted ferrite sintering practice.

In prior practice, when sintering to specifications, namely permeability, loss factor, temperature coefficient, disaccommodation factor, size, saturation magnetization and others, specific sintering conditions of temperature and atmosphere are selected. Thus, it is customarily required in ferrite sintering practice to have a particular firing procedure, with a specified temperature, and controlled atmosphere, to meet desired specifications. Variations in sintering temperatures of as little as five (5) to ten (10) degrees can mean the difference between acceptable and non-acceptable product with prior art materials.

The requirements for precise temperature treatment to produce magnetic components to desired specifications can significantly increase processing costs, equipment costs, and quality control costs. For example, it is difficult to operate a sintering furnace to provide a uniform temperature at differing levels in the furnace. Thus, differing cores in the same batch are likely to be treated at differing temperatures resulting in differing properties. Therefore, when temperature cannot be accurately and/or uniformly controlled throughout the sintering furnace, more arduous testing is required to cull components which do not meet specifications. It is a distinct commercial advantage of the invention that desired magnetic properties can be maintained within desired commercial specifications notwithstanding that differing sintering temperatures may be encountered by different components over a range of at least 100° C., e.g. from 1250° C. to 1350° C. with MnZn ferrite components.

The present invention teaches process control steps to enable control of the precipitate to provide a desired latent insensitivity to sintering conditions while enabling maintenance of properties such as toroidal permeability and loss factor within specifications (the loss factor including effects of hysteresis losses, eddy current losses, and residual losses). In commercial practice, component specifications are usually set at ±20% of nominal toroidal permeability and a maximum loss factor at 100 kHz is established. By selecting processing steps to provide precipitated particles of spherical shape and of a size between one (1) and ten (10) microns, toroidal permeabilities above 3000 and low loss factors about four (4) or less with eight (8) being acceptable for power applications) are maintained, as set forth in Table I, over a sintering temperature range from 1250° C. to 1350° C.

TABLE I

| Sintering Temperature | Toroidal Permeability | Loss Factor (at 100 kHz) |
| --- | --- | --- |
| 1250° C. | 3200 | $2 \times 10^{-6}$ |
| 1320° C. | 3950 | $4 \times 10^{-6}$ |

The above components were produced from precipitated material produced (in a continuous process using a stirred-flow reactor) which provides for minimal agitation time while allowing for optimal (i.e., complete and homogeneous) precipitation, followed by non-agitated digestion time of the particles in the mother liquor for a period of sixteen (16) hours.

Figure 3:

The dried precipitate from which the components of Table I were ultimately made is shown in the scanning electron microscope picture (magnification 2000×) of FIG. 3. The spherical shape of the particles and the size (between one (1) and ten (10) microns) are as noted. With the minimal agitation and mixing time provided for coprecipitation, it is estimated that the precipitate is in a condition to permit dissolution and re-precipitation to take place, eliminating some of the impurities and perfecting the particles, during the digestion period.

Figure 4:
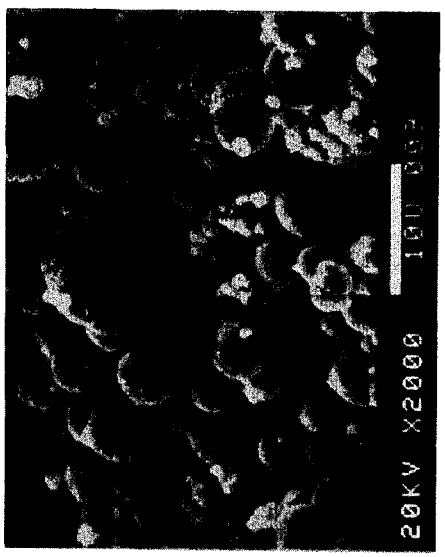
FIGS. 3 through 6 are scanning electron microscope pictures of coprecipitation material for purposes of explaining the invention.

This is deemed to be verified by the results shown in FIG. 4 which is a scanning electron microscope picture (magnification 2000×) of the same material after calcining at 800° C. (for forty-five (45) minutes). That the size of the particles remains substantially the same is to be noted indicating a high density in the particles themselves without significant shrinking in the calcining.

Spherical particles are not only important to final ceramic or spinel crystal formation but also help avoid selective losses which are detrimental to the chemistry. Large particle size helps prevent loss of fine particles which would go through the filter during separation from the mother liquor.

By using a fifteen (15) minute mixing time in a forty (40) gallon mix tank, batch process, the same composition of coprecipitate produces a coarse granular material (FIG. 5) rather than the spherical particles of FIG. 3. Such granular material results in significant increase in loss factor at higher sintering temperatures (compacted components from the same batch differing only in sintering temperature encountered):

TABLE II

| Sintering Temperature | Toroidal Permeability | Loss Factor (at 100 kHz) |
| --- | --- | --- |
| 1250° C. | 2400 | $2.6 \times 10^{-6}$ |
| 1350° C. | 2800 | $13 \times 10^{-6}$ |

Figure 5:
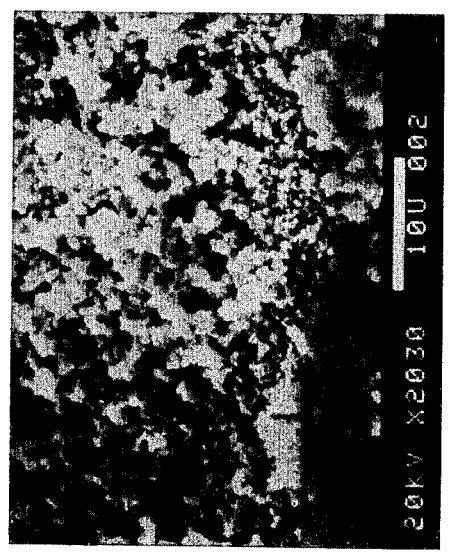

FIG. 5 is a scanning electron microscope picture (magnification 2030×) of the dried precipitate from which the components of Table II were ultimately made. The precipitates for the component of Table II were agitated for fifteen (15) minutes in a batch process forty (40) gallon mix tank followed by a digestion period of sixteen (16) hours. Apparently, after such agitation-mixing time, the precipitate can no longer perfect itself and form the spherical shaped particles shown in FIG. 3.

Figure 6:
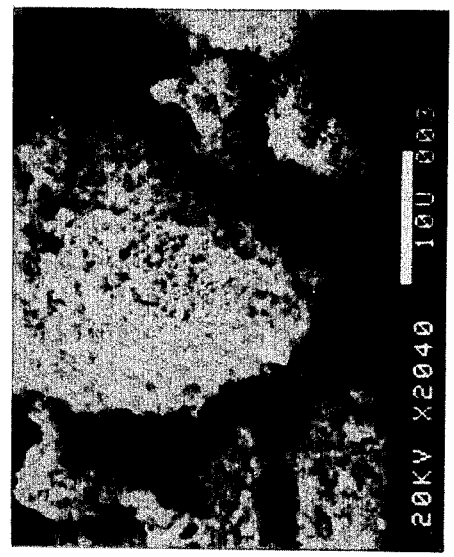

The material has a coarse granular texture and, as shown in FIG. 6 (scanning electrode microscope picture, magnification 2040×), is subject to significant shrinkage when calcined at 800° C. (same calcining as FIG. 4 material).

Firing of spherical (FIGS. 3 and 4) and granular (FIGS. 5 and 6) materials afer processing for manufacture of manganese-zinc ferrite components was carried out in a controlled atmosphere of 100% oxygen for four (4) hours. As noted in Table I, there is no adverse effect on the spherical particle material. This is advantageous because a 100% oxygen atmosphere is also desired at high sintering temperatures to aid in keeping the chemistry intact by preventing or minimizing volatization of zinc. Also, high sintering temperatures are desired because of the time/temperature relationship in sintering (higher temperatures can decrease sintering time required) and the 100% oxygen can help decrease the loss factor, explainable at least in part, by enhanced insulating oxidation at the grain boundaries.

Referring to FIG. 1, the components for manufacture of manganese-zinc ferrites are exposed to a cooling cycle in zone 66. In the specific embodiment being described in relation to FIGS. 3-10, the atmosphere is dropped from 100% to 6% oxygen, with the balance neutral, such as nitrogen, before start of the cooling procedure. Shortly thereafter, the temperature is progressively reduced from firing temperature in an equilibrium atmosphere under which the ferrites are cooled from sintering temperature without net loss or gain of oxygen; such equilibrium cooling practice is well known in the art and is described in "Equilibrium Atmosphere Schedules for the Casting of Ferrites", by John W. Blank, Journal of Applied Physics, March 1961, Supplement to Vol. 32 No. 3.

Figure 7:
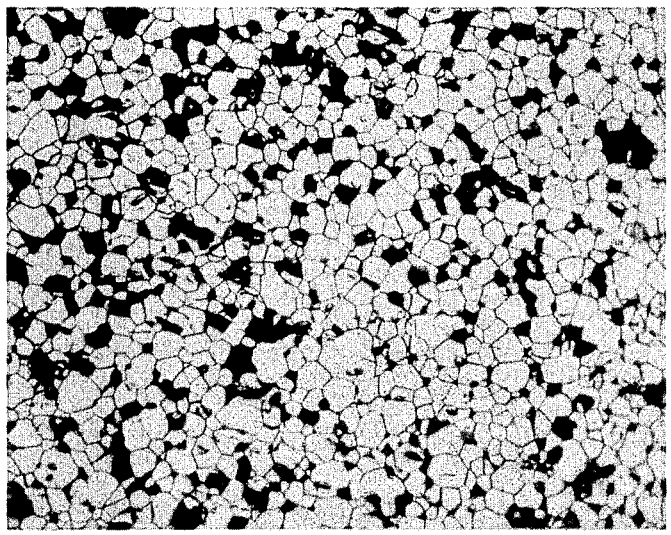
FIGS. 7 through 10 are photomicrographs of magnetically soft manganese-zinc ferrite components for purposes of explaining the invention.
Figure 8:
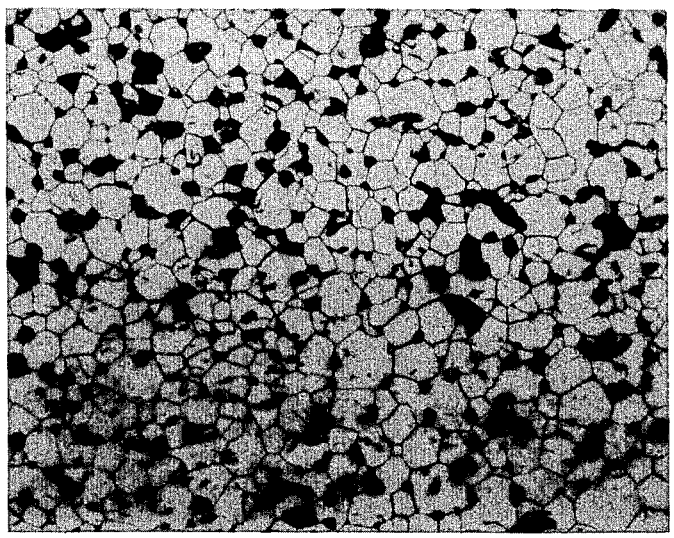

The effects of such sintering and cooling procedures on the spherical particles and the granular material are shown in FIGS. 7 to 10; each is a photomicrograph (magnification 250×) showing the grain structure of the sintered and cooled manganese-zinc ferrite component. FIGS. 7 and 8 show the uniform grain structure of components manufactured from the spherical particles and sintered at 1250° C. and 1350° C., respectively.

Figure 9:
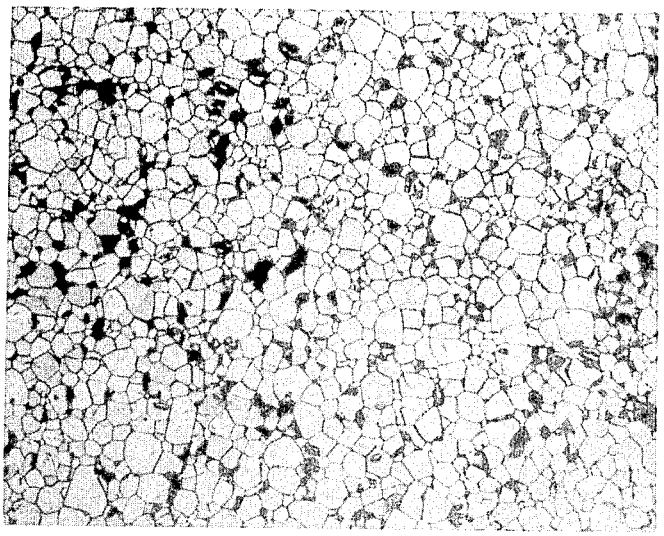
Figure 10:
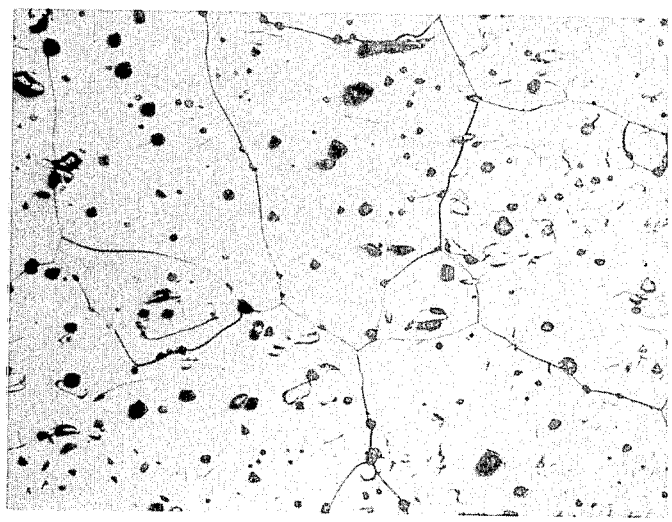

In FIG. 9, it is seen that a component made from the granular material has uniform grain structure at 1250° C.; but, at 1350° C. (FIG. 10), the discontinuous grain growth is evident; this is due in part to an inability of the components made from the treated granular material to accommodate the calcium and silica additives which are conventionally used to increase electrical resistance at the grain boundaries. As set forth in Table II, while permeability was not diminished, the loss factor at 1350° C. is outside of acceptable commercial specifications at $13 \times 10^{-6}$.

Permeabilities and loss factors (1/MuQ) are measured at a frequence of 100 kilo-Hertz. In the well-known formula 1/MuQ, Mu is the initial permeability and Q is the quality factor which is equal to a ratio of the inductive reactance to the loss resistance as described in the Goldman U.S. Pat. No. 3,860,524; such loss factor takes into account eddy current losses, hysteresis losses, and residual losses, as described in the Guillaud U.S. Pat. No. 2,903,429.

Manganese-zinc ferrite cores having permeabilities of 3000 to 4000, and above, can be readily manufactured in accordance with the present invention and exhibit relatively low loss factors; such loss factors being in the range of $2 \times 10^{-6}$ to $4 \times 10^{-6}$ at the 4000 perm level. Such manganese-zinc ferrite cores meet the exacting requirements for telecommunication circuitry uses, e.g. as channel filters and for switched-mode power supplies in power applications for electronic control and computer uses. In addition, temperature coefficient and physical strength are within acceptable standards within such industries for dry process ferrite cores.

Concurrent coprecipitation of both carbonates and hydroxides and controlling process steps to control characteristics of the precipitate are applicable to the preparation of dried precipitate for subsequent processing and conversion to material for compacting into soft ferrite components including manganese-zinc ferrites, nickel (nickel-zinc, nickel) ferrites, and magnesium (magnesium-manganese) ferrites.

Manganese-zinc ferrites use an excess of iron so that ferrous oxide is generally present to a significant degree in the finished ferrite. Ferric oxide ($Fe_2O_3$) is fifty mole percent of the nickel ferrites and fifty mole percent or lower for magnesium ferrites. Oxide proportions for these ferrites determine the original proportions of the pure metals used to make up the metal ion solutions.

In preparing dried precipitate for manufacture of nickel ferrimagnetic materials using the present invention, sodium or potassium compounds (e.g. sodium carbonate and sodium hydroxide) should be substituted for the ammonium compounds disclosed above in order to avoid the problem of nickel complexes with the ammonia. With such substitution, possible sodium residues must be considered in the final ferrite.

In preparing nicle-zinc ferrite components using the present invention, a metal ion solution is prepared with the objective of producing a molar percentage in the components of:
about 50% $Fe_2O_3$,
about 25% NiO, and
about 25% ZnO.

The chemistry achieved in the final components verifies for those skilled in the art the exceptional compositional results available with the present invention. The following chemistry is achieved:
49.5 mole % $Fe_2O_3$,
25.2 mole % NiO, and
25.3 mole % ZnO.

Among the various NiZn ferrite compositions, known from conventional dry process art, the molar percentage of the NiO can vary between about seventeen (17%) to fifty (50%) as the molar percentage of the ZnO varies between zero and thirty-three (33%) with the ferric ions to divalent metal ions being in the ratio of 2:1.

In nickel-zinc ferrite manufacture, the pH of the carbonate-hydroxide solution with a value of about eleven (11) is reduced to seven point five (7.5) by addition of the metal ion solution. Process steps are carried out substantially as described in relation to the manganese-zinc ferrites with, however, the firing being carried out at 1200° C. in air with furnace cooling in the same atmosphere.

In preparing magnesium-manganese ferrite components using the present invention, a metal ion solution is prepared to produce a molar percentage in the components of:
50% $Fe_2O_3$,
30% MgO, and
20% MnO.

The compositional results achieved with this example are as follows:
51 mole % $Fe_2O_3$,
28.5 mole % MgO, and
20.5 mole % MnO.

Among the various MgMn ferrite compositions known from the conventional dry process art, the molar percentage of the MgO can vary from about ten (10%) to forty (40%), the molar percentage of the MnO can vary from about ten (10%) to forty (40%), and at times ZnO up to about fifteen mole percent (15%) can be used. The ferric oxide can vary from about thirty-five to fifty mole percent (35–50%).

Sodium or potassium compounds are preferred in preparing the carbonate-hydroxide solution since magnesium carbonate is soluble in excess ammonium salt solutions, with potassium compounds being preferred. The pH of the carbonate-hydroxide solution with a value of about eleven (11) is reduced to a value of about eight point two (8.2) by addition of the metal ion solution. In order to speed up the precipitation reaction, the solution is heated. Other process steps are carried out substantially as described in relation to the manganese-zinc ferrites; with, however, the firing being carried out at 1200° C. in air and furnace cooling being carried out in nitrogen.

Figure 2:
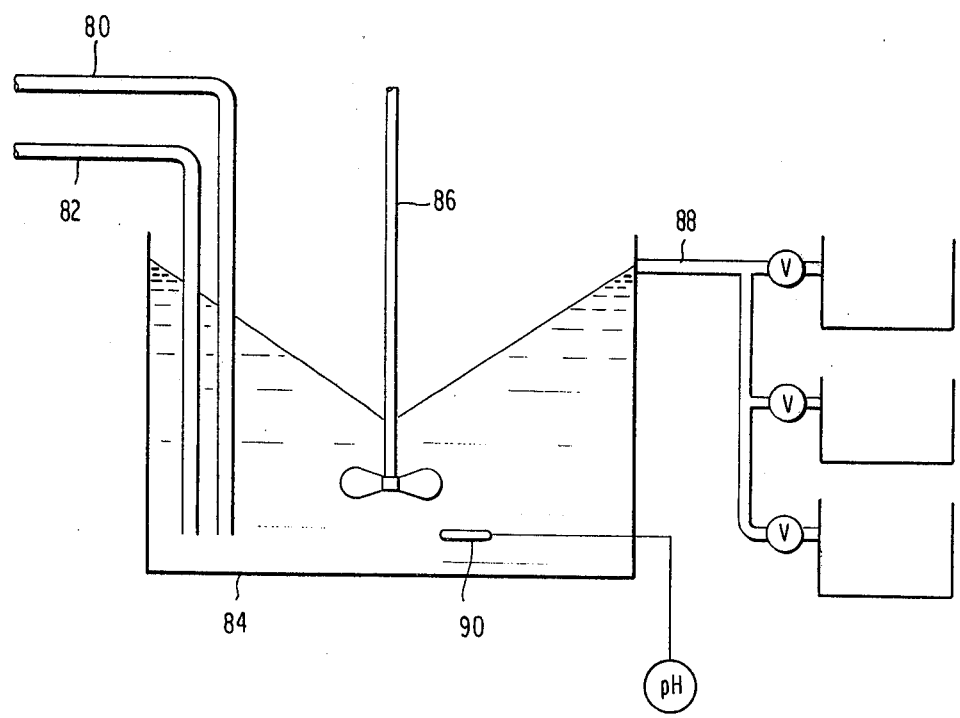

The stirred-flow reactor used in the continuous or semi-continuous process is shown schematically in FIG. 2 in which metal ion solution is fed through conduit 80 and carbonate/hydroxide solution through conduit 82 into reactor 84. The slurry of precipitate and mother liquor, as stirred by driven stirrer 86, overflows through conduit 88 and is accumulated in one of the holding tanks shown utilizing the valving shown. The pH can be maintained for control purposes by insertion of pH probe 90, preferably about the stirring blade.

In a specific embodiment from which the above data was provided, the pumping rate for the metal ion solution was 15.5 cc/sec, for the carbonate/hydroxide solution the rate was 46.5 cc/sec to make a total feed of 62 cc/sec. Residence time in a non-stirred reactor would be the volume (2260 cc reaction vessel used) divided by the flow rate (in cc/sec). However, dependent on the vortexing action created by the stirrer, the effective volume is decreased.

In the specific embodiment, the residence time (and therefore the mixing time) before overflow to a holding tank was in the range of five (5) to ten (10) seconds. With a decrease in externally applied physical agitation, the residence time can be increased to about thirty (30) seconds in the embodiment shown.

Advantages of the spherical shaped material include adaptability to use a high (1200° C. to 1400° C.) sintering temperatures and avoidance of detrimental effect on components from the same batch which encounter differing temperatures in the sintering furnace. In addition, the spherical particles exhibit an insensitivity to the sintering atmosphere which makes components prepared from such materials adaptable to firing procedures which may already be established in a furnace for other components and thus saves valuable production time otherwise required for change of furnace conditions. For example, it has been found that oxygen content of the sintering atmosphere can be as low as 2% and, properties within desired specifications are obtained and desired uniform grain growth is maintained.

Figure 11:
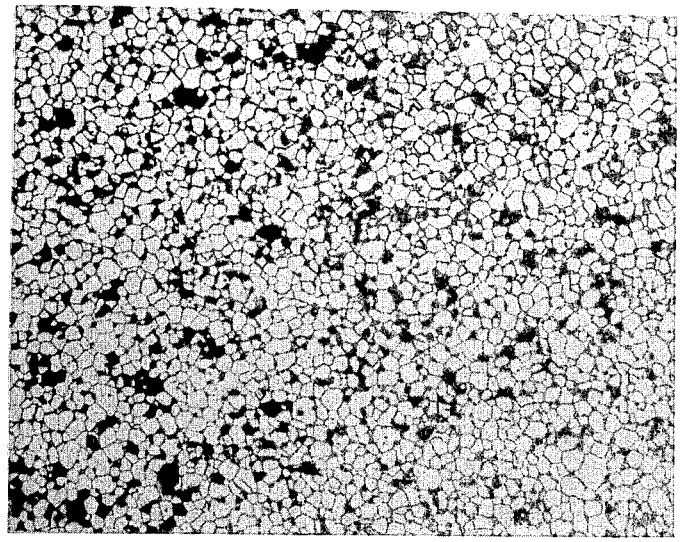
FIG. 11 is a photomicrograph of a magnetically soft manganese-zinc ferrite component for purposes of explaining the invention.

In the photomicrograph (magnification of 250×) of FIG. 11, the spherical particle material of FIGS. 3 and 4, as processed and compacted, was sintered for four (4) hours at 1280° C. in a 2% oxygen (balance nitrogen) atmosphere for four (4) hours before equilibrium cooling. As seen in FIG. 11, the grain growth was uniform; the permeability of 3900 and loss factor of $2.1 \times 10^{-6}$ at 100 kHz exhibited by the component of FIG. 11 are within commercial specifications. Similarly, components from the same material sintered for four (4) hours at 1300° C. in a 100% oxygen atmosphere had a uniform grain growth; such components exhibited a permeability of 3550 and loss factor of $2.5 \times 10^{-6}$ at 100 kHz.

Ammonium compounds, as the source of carbonate and hydroxide ions, are preferred over the corresponding metallic compounds because the opportunity for residual metal is eliminated, i.e. the ammonia is volatile. However, potassium or sodium compounds can be utilized but possible residuals of sodium or potassium in the product detract from the magnetic properties and must be considered.

The term "article" or "component" as used includes cores such as pot cores, U & E cores, and toroids as well as recording heads, deflection yokes, blocks (which are machined by the consumer) and other parts that form or are joined together to form inductors.

Substitution of equivalent materials and steps made available in the light of present teachings may be made without departing from the spirit or essential characteristics of the invention. For example, in the metal ion solution forming step, acids other than sulfuric can be utilized. Nitric acid and hydrochloric acid are two practical substitutes. Further, soluble salts of the metal ions can be used as starting materials by being placed in solution (acidic). While relying on basic discoveries of the present invention, manufacture of high permeability (10,000 and above) ferrite components is possible because of the availability of high purity metals and precise chemistry control; also, lower cost materials and/or procedures can be used to manufacture lower permeability ferrite components (about 2000); and, within such manufacturing options, loss factors can be readily kept below specification levels which have been acceptable in the past at particular permeability levels.

We claim:

1. Method for carbonate-hydroxide coprecipitation of materials for manufacture of magnetically soft ferrites and for controlling characteristics of such coprecipitated materials comprising forming an aqueous metal ion solution of ferrous ions and divalent ions of at least one other metal in which the divalent metal ions of said at least one other metal are selected from the group consisting of $Mn++$, $Ni++$, $Mg++$, and $Zn++$, providing a base solution of carbonates and hydroxides by combining in solution carbonate ion and hydroxide ion source materials selected from the group consisting of ammonium carbonate, ammonium bicarbonate, ammonium hydroxide, sodium carbonate, sodium hydroxide, potassium carbonate, and potassium hydroxide, the base solution having a pH of about eleven, combining such metal ion solution and such base carbonate and hydroxide ion solution to form a reaction liquor for precipitation of metal carbonates and metal hydroxides, the reaction liquor having a pH between about 7.5 and about 8.5, and controllably limiting physical agitation applied in combining such metal ion and base solutions by limiting mixing times of such solutions between about five and about thirty seconds and controllably holding the resulting slurry of metal carbonate-hydroxide precipitate in mother liquor substantially free of applied physical agitation for a time sufficient to effect formation of spherical particles having a size between about one and about ten microns in diameter.

2. The method of claim 1 in which the divalent metal ions of said at least one other metal include $Mn++$ and $Zn++$.

3. The method of claim 2 in which the resulting slurry of metal carbonate-hydroxide precipitate in mother liquor is held for a digestion period in excess of one hour.

4. The method of claim 3 further including the steps of
   separating such metal carbonate-hydroxide precipitate from the mother liquor after such holding period, and then
   drying such separated precipitate.

5. THe method of claim 4 further including the step of
   calcining such metal carbonate-hydroxide precipitate at temperatures up to about 800° C.

6. The method of claim 5 further including the steps of
   pulverizing such calcined material, then
   compacting such pulverized material to form a magnetic component, and then
   sintering such magnetic component at elevated temperatures between about 1200° C. and 1400° C.

7. The method of claim 6 in which such sintering is carried out at 1250° C. to 1350° C. in 100% oxygen for about four (4) hours.

8. The method of claim 7 in which such sintering in 100% oxygen is followed by
   reducing oxygen to about 6% by substituting a neutral gas, such as nitrogen, and then
   controlling cooling of the magnetic component during which the oxygen percentage of the atmosphere is further reduced with partial pressure of the oxygen being controlled so as to substantially prevent a net loss or gain in oxygen in the magnetic component.

9. The method of claim 1 wherein
   metal carbonate-hydroxide precipitate in mother liquor is held for a digestion period of about sixteen hours at about 20° C.

* * * * *